United States Patent [19]

Normoyle et al.

[11] Patent Number: 5,710,891
[45] Date of Patent: Jan. 20, 1998

[54] PIPELINED DISTRIBUTED BUS ARBITRATION SYSTEM

[75] Inventors: Kevin B. Normoyle, San Jose; Zahir Ebrahim, Mountain View; Satyanarayana Nishtala, Cupertino; William C. Van Loo, Palo Alto; Louis F. Coffin, III, San Jose, all of Calif.

[73] Assignee: Sun Microsystems, Inc., Mountain View, Calif.

[21] Appl. No.: 414,559

[22] Filed: Mar. 31, 1995

[51] Int. Cl.$^6$ .................................................. G06F 13/00
[52] U.S. Cl. .................... 395/299; 395/305; 395/730
[58] Field of Search ........................ 395/299, 291, 395/305

[56] References Cited

U.S. PATENT DOCUMENTS

| | | | |
|---|---|---|---|
| 4,228,503 | 10/1980 | Waite | 364/200 |
| 4,979,099 | 12/1990 | Milia et al. | 395/305 |
| 5,036,459 | 7/1991 | den Haan | 364/200 |
| 5,111,424 | 5/1992 | Donaldson et al. | 395/725 |
| 5,148,545 | 9/1992 | Herbst et al. | 395/728 |
| 5,168,568 | 12/1992 | Thayer et al. | 395/725 |
| 5,299,196 | 3/1994 | Allen, Jr. | 370/85.1 |

(List continued on next page.)

FOREIGN PATENT DOCUMENTS

| | | | |
|---|---|---|---|
| 0 317 481 A3 | 11/1987 | European Pat. Off. | G06F 15/16 |
| 0 380 842 A2 | 2/1989 | European Pat. Off. | G06F 12/08 |
| 0 468 831 A2 | 6/1990 | European Pat. Off. | G06F 12/08 |
| 0 507 571 A3 | 4/1991 | European Pat. Off. | G06F 5/06 |
| 0 537 899 A1 | 9/1991 | European Pat. Off. | G06F 9/46 |
| 0 598 535 A1 | 11/1992 | European Pat. Off. | G06F 12/08 |
| 0 644 489 A3 | 9/1993 | European Pat. Off. | G06F 9/46 |
| PCT/US92/ 05458 | 6/1992 | WIPO | G06F 13/00 |

OTHER PUBLICATIONS

IBM Technical Disclosure Bulletin, "Real–Time, Self–Granting, Centrally Directed Distributed Arbitration With Fairness", vol. 38, No. 3, pp. 421–424, Mar. 1995, New York.

IBM Technical Disclosure Bulletin, "Multi–Processor Bus Distributed Arbitration With Centralized Fairness":, vol. 34, No. 11, pp. 200–208, Apr. 1992, New York.

(List continued on next page.)

*Primary Examiner*—Ayaz R. Sheikh
*Attorney, Agent, or Firm*—Gary S. Williams; Flehr Hohbach Test Albritton & Herbert LLP

[57] ABSTRACT

The present invention provides a scalable, modular and pipelined distributed bus arbitration system for efficiently resolving bus contention between sub-systems, e.g., processors, coupled to a common system bus. The arbitration system includes a plurality of distributed bus arbiters which receives the bus requests from the sub-systems and independently determine the next bus master. The arbitration protocol enables the arbitration process to be eliminated from the critical timing path thereby allowing the system to operate at the maximum system clock frequency possible for a given integrated circuit (IC) technology to reduce overall system clock latencies. Any change among the sub-systems during an arbitration clock cycle is based on any system bus request(s) which are active during a clock cycle immediately preceding the arbitration clock cycle, and is independent of any system bus request(s) asserted during the arbitration clock cycle. In addition, the arbitration protocol treats a current bus master, i.e., the bus master driving the system bus, preferentially. Each arbitration task is completed within a system clock cycle regardless of processor speed. As a result, the arbitration latency for retaining the current bus master is one system clock cycle while the latency for selecting and switching bus masters is two system clock cycles. In this implementation, a last port driver is the only sub-system permitted to assert a bus request in a clock cycle and immediately drive the system bus in the next immediate clock cycle. Conversely, when a second sub-system which is not the last port driver needs to drive an inactive system bus, the second sub-system asserts its bus request line in a first clock cycle, and arbitration within all the respective bus arbiters occurs in a second clock cycle.

5 Claims, 7 Drawing Sheets

U.S. PATENT DOCUMENTS

| | | | |
|---|---|---|---|
| 5,319,753 | 6/1994 | MacKenna | 395/275 |
| 5,369,748 | 11/1994 | McFarland et al. | 395/325 |
| 5,388,232 | 2/1995 | Sullivan et al. | 395/285 |
| 5,428,799 | 6/1995 | Woods | 395/725 |
| 5,430,848 | 7/1995 | Waggener | 395/303 |

OTHER PUBLICATIONS

D. Alpert, et al., "Architecture of the NS32532 Microprocessor", Proceeding/IEEE International Conference on Computer Design: VLSI in Computers & Processors, IEEE Computer Society Press, Mar. 5, 1987, pp. 168–172.

Jung–Herng Chang, et al., "A Second–Level Cache Controller for a Super–Scalar Sparc Processor", Spring Sompcon 92, IEEE Computer Society Press, Feb. 24, 1992, pp. 142–151.

K. Lantz, et al., "Rochester's Intelligent Gateway", Computer, vol. 15, No. 10 (Oct. 1982), pp. 54–68.

M. Cvijovic, et al., "An Approach to the Design of Distributed Real–Time Operating Systems", Microprocessors and Microsystems, vol. 16, No. 2, 1992, pp. 81–89.

IEEE Std 896.2–1991, entitled "IEEE Standard for Futurebus+—Physical Layer and Profile Specification".

| LAST PORT DRIVER | ARBITRATION PRIORITY HIGHEST TO LOWEST |
|---|---|
| PORT$_0$ | 0 1 2 3 |
| PORT$_1$ | 1 2 3 0 |
| PORT$_2$ | 2 3 0 1 |
| PORT$_3$ | 3 0 1 2 |

PIPELINED DISTRIBUTED BUS ARBITRATION SYSTEM

BACKGROUND OF THE INVENTION

1. Field of the Invention

The present invention relates to the field of computer systems architecture. More particularly, the invention relates to system bus arbitration protocols.

2. Description of the Related Art

In the design of an efficient system architecture with a number of sub-systems, e.g., multi-processor system, the use of a common system bus shared by the sub-systems is useful for satisfying several important design goals. These goals include minimizing the total number and cost of interconnections between the sub-systems, maintaining modularity in the interfaces of sub-systems, and simplifying the integration of interfaces for add-on sub-systems, e.g., expanded memory and peripherals. However, sharing a system bus necessitates the use of a bus arbitration protocol to resolve the inevitable bus contentions form the sub-systems.

Conventional bus arbitration protocols for resolving bus contentions can be divided into two general classes; centralized arbitration and distributed arbitration protocols. In an exemplary conventional centralized arbitration system 110, as shown in FIG. 1A, system 110 includes processors 111, 112, 113, 114, a system bus 118 and a centralized arbiter 119. System bus 118, e.g., Address_bus, is coupled to processors 111, 112, 113, 114 and centralized arbiter 119. In addition, each of processors 111, 112, 113, 114 is coupled to centralized arbiter 119 by one of bus request lines Req_0, Req_1, Req_2, Req_3, and one of bus grant lines Bus_Grant_0, Bus_1, Bus_Grant_2, Bus_Grant_3, respectively.

Centralized arbiter 119 is the sole bus arbiter and is responsible for arbitrating all bus contentions. When one of processors 111, 112, 113, 114 needs to drive system bus 118, a request is made to centralized arbiter 119 via the appropriate bus request line. If no other processor is contending for system bus 118, centralized arbiter 119 assigns bus 118 to the requesting processor. Conversely, if two or more processors make a bus request within a pre-determined period, centralized arbiter 119 uses a suitable allocation scheme, e.g., a round robin or a predetermined priority scheme, to decide which processor should be assigned the next bus master. In either case, centralized arbiter 119 communicates the bus grant to the assigned processor via the appropriate bus grant line. For example, processor 111 makes a request to arbiter 119 via bus request line Req_0 and eventually receives a grant from arbiter 119 via bus grant line Bus_Grant_0.

FIG. 1B is a block diagram of a conventional distributed arbitration system 120 which includes processors 121, 122, 123, 124 and a system bus 128. System bus 128, e.g., Address_bus, is coupled to processors 121, 122, 123, 124. In addition, processors 121, 122, 123, 124 are coupled to each other by bus request lines Req_0, Req_1, Req_2, Req_3 and also by bus control lines Bus_Busy_0, Bus_Busy_1, Bus_Busy_2, Bus_Busy_3.

The distributed arbitration protocol dictates that all processors 121, 122, 123, 124 are responsible for simultaneously arbitrating bus contentions and assigning the same processor to be the next bus master. For example, when one of processors 121, 122, 123, 124 needs to drive system bus 128, a request is broadcasted to every other processor coupled to bus 128 via the appropriate bus request line. If no other processor is contending for system bus 128, all the other processors will independently assign bus 118 to the requesting processor. Conversely, if two or more processors make a bus request within a pre-determined period, then each of processors 121, 122, 123, 124 uses a suitable identical allocation scheme to independently arrive at the same conclusion as to which processor should be the next bus master. In either case, the processor assigned to be the next bus master captures system bus 128 by asserting the appropriate bus busy line, thereby communicating to all the other processors that system bus 128 is now in use. For example, processor 121 broadcasts a bus request on bus request line Req_0. When system bus 128 is free and none of the other bus request lines Req_1, Req_2 and Req_3 has been asserted by a processor with higher priority, processor 121 proceeds to capture system bus 128 by asserting bus control line Bus_Busy_0. One such example of a distributed arbitration scheme is the "Futurebus+" based on the I.E.E.E. Standard 896.2-1991.

In most conventional bus arbitration protocols, such as the above mentioned protocols, in order to minimize the overall delay arising from bus arbitration, the sequential tasks of sending and receiving a bus request, and assigning the next bus master are completed in the same system clock cycle. While it is expedient to attempt to complete processing of the bus request and the corresponding bus driver assignment in one system clock cycle, as the system clock speed increases in response to processors with faster processor clocks, the ability to receive a bus request and complete the arbitration process within a single fast system clock cycle is no longer attainable. Hence, these conventional bus arbitration protocols are not scalable with respect to faster processors. A system designer is forced to either slow the system clock speed or to use multiple system clock cycles for resolving bus contentions. As a result, the performance is inhibited by either a slower system clock speed or extra system clock latencies inserted for solely arbitrating bus contentions.

Hence, there is a need for a solution to the bus arbitration problem that is efficient, cost effective, modular and scalable as processor clock speeds increase.

SUMMARY OF THE INVENTION

The present invention provides a scalable, modular and pipelined distributed bus arbitration system for efficiently resolving bus contention between sub-systems, e.g., processors, coupled to a common system bus. The arbitration system includes a plurality of distributed bus arbiters which receive the bus requests from the sub-systems and independently determine the next bus master.

In accordance with one embodiment of the invention, three principles provide minimal system clock latencies associated with the transfers via the system bus. First, any change among the sub-systems during an arbitration clock cycle is based on any system bus request(s) which are active during a clock cycle immediately preceding the arbitration clock cycle, and is independent of any system bus request(s) asserted during the arbitration clock cycle. Second, the arbitration protocol treats a current bus master, i.e., the bus master driving the system bus, preferentially. Third, output bus signals, e.g., bus request and drive enable signals, on the system bus are generated directly by output registers of the sub-systems without any intervening arbitration logic. Similarly, there is no arbitration logic coupled between the system bus and input registers of the sub-systems for receiving input bus signals, i.e., the input registers are directly coupled to the system bus.

These principles permit the arbitration process to be eliminated from the critical timing path thereby allowing the system to operate at the maximum system clock frequency possible for a given integrated circuit (IC) technology thereby reducing overall system clock latencies. In addition, each arbitration task is completed within a system clock cycle regardless of processor speed. As a result, the arbitration latency for retaining the current bus master is one system clock cycle while the latency for selecting and switching bus masters is two system clock cycles.

The arbitration protocol also allows a "real-parking" mode that further reduces arbitration latencies in a simpler system where there are only two possible bus masters contending for the system bus. In the case of the simpler system, the arbitration latency for retaining the current bus master can be reduced to zero system clock cycles, but increases the latency of switching current bus masters to four system clock cycles.

In this embodiment, a modified round-robin protocol is used to prioritize accesses among competing sub-systems to the system bus. Each sub-system occupies a port, i.e., a location, on the system bus and is assigned a unique identification number (ID). Every port keeps track of which port is the last port driver and then simultaneously (concurrently) determines which port should be assigned, i.e., selected to be, the next bus master based on the identity of the last port driver. Consequently, whenever a port wins arbitration and becomes the current bus master, the identity of the last port driver stored by every port is updated with the ID of the new current bus master. For efficiency, the last port driver is treated preferentially during priority assignments. Initially, upon system reset, the arbitration system is synchronized by selecting a sub-system on a predefined port to be the last port driver by every sub-system.

In some embodiments, the arbitration protocol allows a pre-assigned special port to be treated preferentially, i.e., the special port is not required to participate in the round-robin scheme. Instead, the special port is given the highest priority whenever its bus request is asserted. The special port protocol advantageously offers specific flexibility in the design of the higher level system architecture. Hence, when the special port wins arbitration, the last port driver identity maintained by all the ports coupled to the system is not updated since the special port does not participate in the round-robin protocol.

In this implementation, the last port driver is the only sub-system permitted to assert a bus request in a clock cycle and immediately drive the system bus in the next immediate clock cycle. Upon driving the system bus the first sub-system becomes the current bus master. Subsequently, the current bus master is permitted to transmit multiple data packets back to back without any system clock latency by simply holding its bus request line. Although the current bus master may drive zero or more transaction packets before relinquishing the bus, in order to eliminate the possibility of a system bus deadlock, the current bus master should relinquish the bus within a finite number of clock cycles. In addition, the current bus master should relinquish its bus request line when the current driver has no more requests pending.

Conversely, when a second sub-system which is not the last port driver needs to drive an inactive system bus, the second sub-system asserts its bus request line in a first clock cycle. Arbitration within all the respective bus arbiters occurs in the next clock cycle, i.e., the second clock cycle. Assuming that none of the other sub-systems has a higher priority than the second sub-system, then the second sub-system can now be assigned the next bus master and permitted to drive the bus in a third system clock cycle. Hence, two latent system clock cycles are needed where the requesting sub-system is not the last port driver and the system bus is inactive.

Advantages of the pipelined bus arbitration system include the ability to scale the arbitration system as sub-system clock speeds, e.g., processor clock speeds, increase, accomplished by eliminating the arbitration logic from the critical path. Scalability is advantageous because most digital computers are based on a synchronous system clock and so a high clock speed is important for optimizing performance. Hence the ability to scale the arbitration system without increasing arbitration latencies permits minimization of the system clock cycle while maintaining minimal overall arbitration latencies. The modularity of the system also makes it easy to expand the system bus and increase the number of sub-systems. Other advantages include minimal latency for the last port driver to become the current bus master, which is especially important in systems where the sub-systems occupying the ports generate bursty traffic on the system bus, such as processors.

DESCRIPTION OF THE DRAWINGS

The objects, features and advantages of the system of the present invention will be apparent from the following description in which.

NOTATIONS AND NOMENCLATURE

System controller (SC): a central controller coupled to a system bus for orchestrating the cache coherency, data flow, flow control, and memory operations.

System bus master: a sub-system capable of initiating a data/address transfer on the system bus.

Next bus master: the sub-system permitted to drive the system bus in the next system clock cycle.

Current bus master: the sub-system which is presently permitted to drive the system bus.

Last port driver: the sub-system which was last permitted to drove the system bus.

Port: a location or position occupied by a sub-system on the system bus which has a unique port identifier.

DESCRIPTION OF THE PREFERRED EMBODIMENTS

In the following description, numerous details provide a thorough understanding of the invention. These details include functional blocks and an exemplary pre-determined arbitration priority scheme to assist a systems designer in implementing an efficient pipelined distributed bus arbitration system. While the bus arbitration system is illustrated by a specific implementation, the invention is applicable to a wide variety of system architectures and environments. In other instances, well-known circuits, structures and program code are not described in detail so as not to obscure the invention unnecessarily. Accordingly, co-pending patent application, entitled "Packet Switched Cache Coherent Multiprocessor System", U.S. patent application Ser. No. 08/415,175, our reference number P731, assigned to Sun Microsystems, Inc., herein incorporated by reference in its entirety, provides a detailed specification of the pipelined distributed bus arbitration protocol in accordance with the present invention.

Figure 1A:
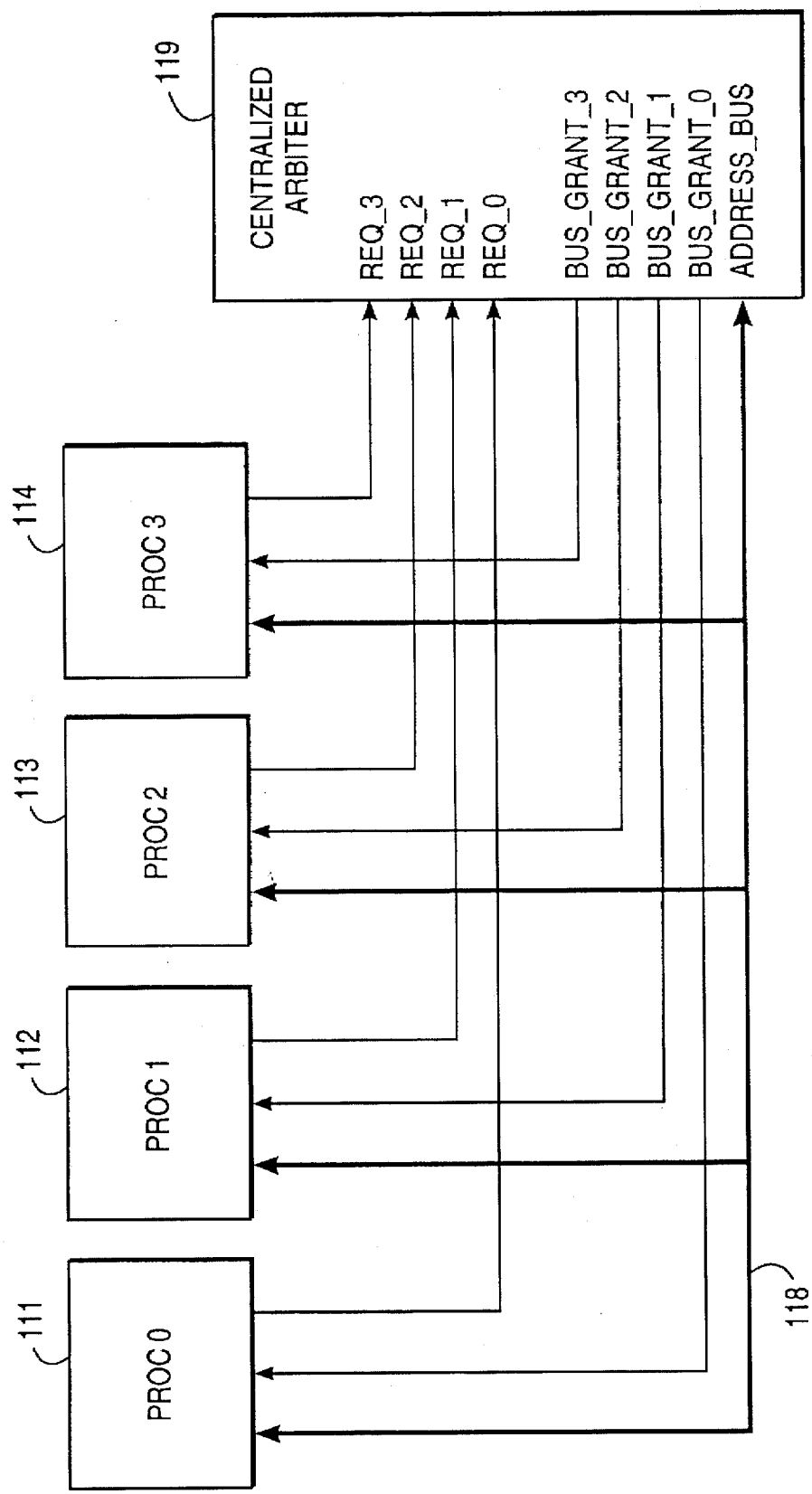
FIG. 1A is a block diagram of a conventional system bus having a centralized bus arbitration protocol.
Figure 1B:
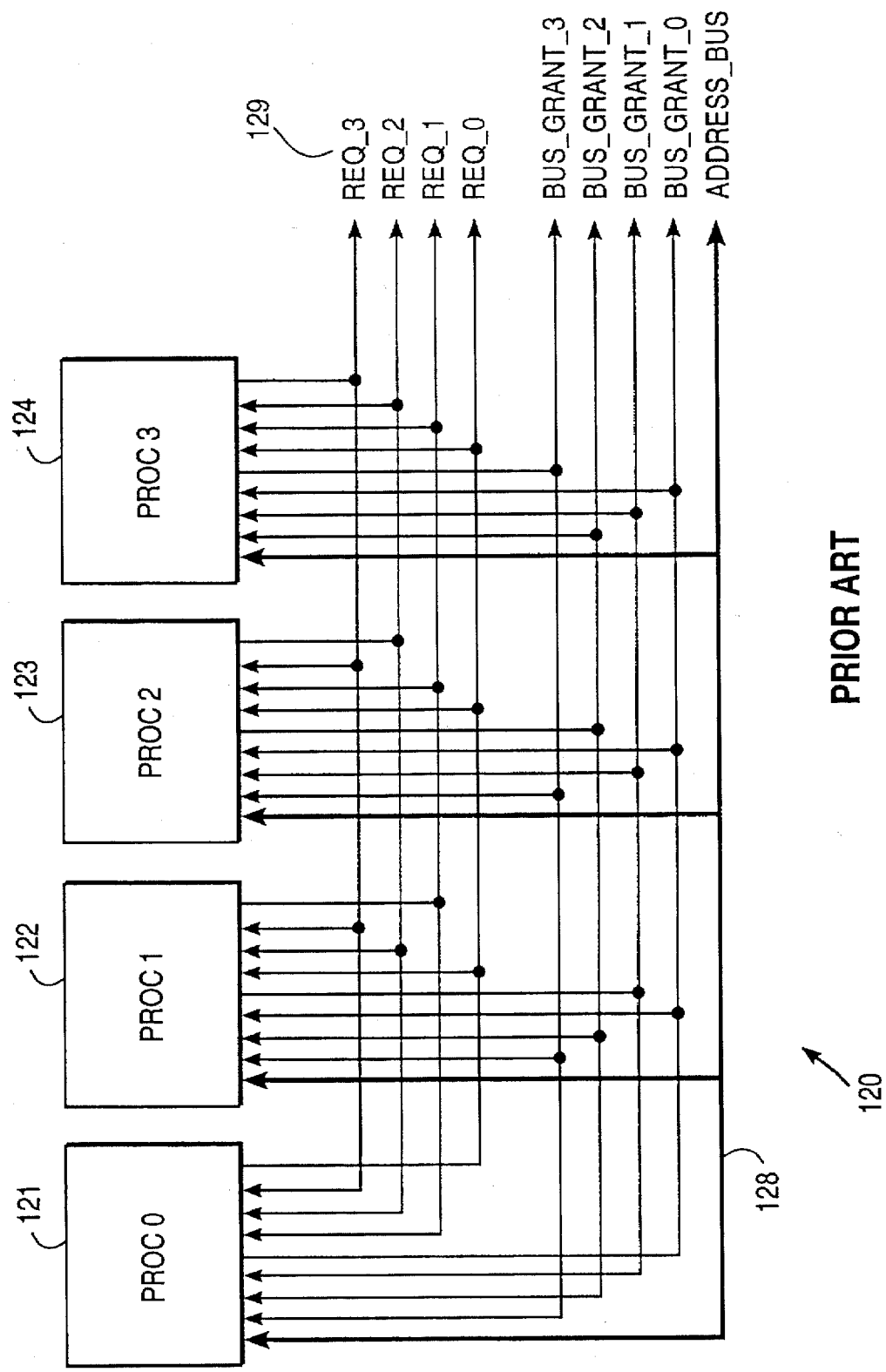
FIG. 1B is a block diagram of a conventional system bus having a distributed bus arbitration protocol.
Figure 2:
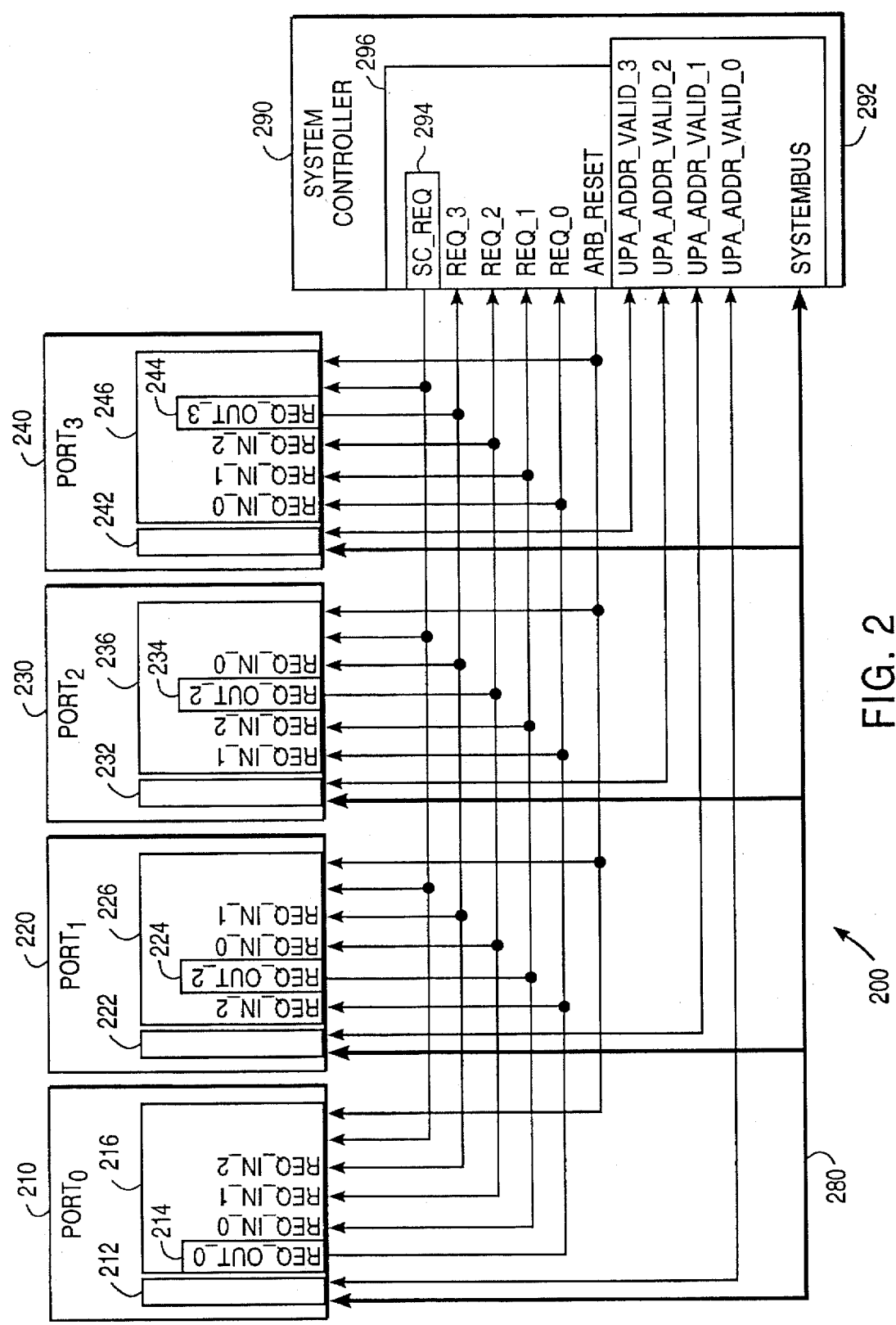
FIG. 2 is a block diagram of a system bus using a distributed synchronous bus arbitration protocol in accordance with the invention.

In one embodiment, as illustrated by the block diagram of FIG. 2, system 200 includes multiple sub-systems, e.g., processors 210, 220, 230, 240, a system bus 280, and a system controller 290. Each sub-system includes a bus transceiver, a bus requester and a bus arbiter. For example, processor 210 includes a bus transceiver 212, a bus requester 214 and a bus arbiter 216. Similarly, system controller 290 includes a bus transceiver 292, a bus requester 294 and a bus arbiter 296. Collectively, bus arbiters 216, 226, ... 296 form the distributed arbitration system of the present invention.

In this implementation, system bus 280 is an address bus, thereby advantageously enabling data to be simultaneously transferred over a separate data bus (not shown) while the address bus is busy. Nevertheless, the present invention is equally applicable to other systems where system bus 280 is a dedicated data bus or a combined address/data bus. In addition, although the described sub-systems are all bus masters, the arbitration protocol is also applicable to systems where the sub-systems includes both bus master(s) and bus slave(s). Hence, with respect to this embodiment of system 200, a current bus master is also a current bus driver.

System bus 280 interconnects the respective bus transceivers 212, 222, 232, 242 of processors 210, 220, 230, 240 to bus transceiver 292 of system controller 290. Processors 210, 220, 230 and 240 are also coupled to system controller 290 by their respective bus qualifier lines UPA_Addr_Valid_0, UPA_Addr_Valid_1, UPA_Addr_Valid_2 and UPA_Addr_Valid_3.

Bus requesters 214, 224, 234, 244, 294 and bus arbiters 216, 226, 236, 246, 296 of processors 210, 220, 230, 240 and system controller 290, respectively, are coupled to each other via the following arbitration control lines. A system arbitration reset line Arb_Reset couples system controller 290 to all processors 210, 220, 230, 240. A Req_out_0 line of bus requester 214 is coupled to a Req_0 line of system controller's bus arbiter 296 and to Req_in_2, Req_in_1, Req_in_0 lines of bus arbiters 226, 236, 246, respectively, and a Req_out_1 line of bus requester 224 is coupled to Req_1, Req_in_0, Req_in_2, Req_in_1 lines of bus arbiters 296, 216, 236, 246, respectively. Similarly, a Req_out_2 line of bus requester 234 is coupled to Req_2, Req_in_1, Req_in_0, Req_in_2 lines of bus arbiters 296, 216, 226, 246, respectively, and a Req_out_3 line of bus requester 244 is coupled to Req_3, Req_in_2, Req_in_1, Req_in_0 lines of bus arbiters 296, 216, 226, 236, respectively. Finally, a SC_Req line of system controller's bus requester 294 couples controller 290 to bus arbiters 216, 226, 236, 246 of processors 210, 220, 230, 240, respectively.

Although counter-intuitive on its face, one underlying technique used in the pipelined distributed bus arbitration system is to divide the arbitration sequence into separate tasks for processing in separate clock cycles. For example, the sensing of outstanding bus request(s) and the assignment of a next bus master are completed in separate clock cycles. Another technique is to minimize the frequency of changeovers of the current bus master. Yet another technique is to minimize the total number of clock cycles lost when a changeover of the current bus master is needed. By applying these techniques, each arbitration task is completed within a system clock cycle regardless of processor clock speed and wherever possible, arbitration tasks are eliminated from the critical path, thereby reducing the number of system clock cycle latencies due to bus arbitration.

As a result, the following minimal arbitration latencies are possible in this implementation. A current bus master can transmit data packets back to back without any system clock latency. A last port driver is permitted to request for and drive the system bus in consecutive system clock cycles, i.e., one system clock latency. When a processor is not the last port driver, then there is a minimum of two system clock latencies. Finally, a minimum of three latent system clock cycles are needed to displace a different current bus master. These minimal system clock latencies are accomplished by the following rules.

Figures 3A, 3B:
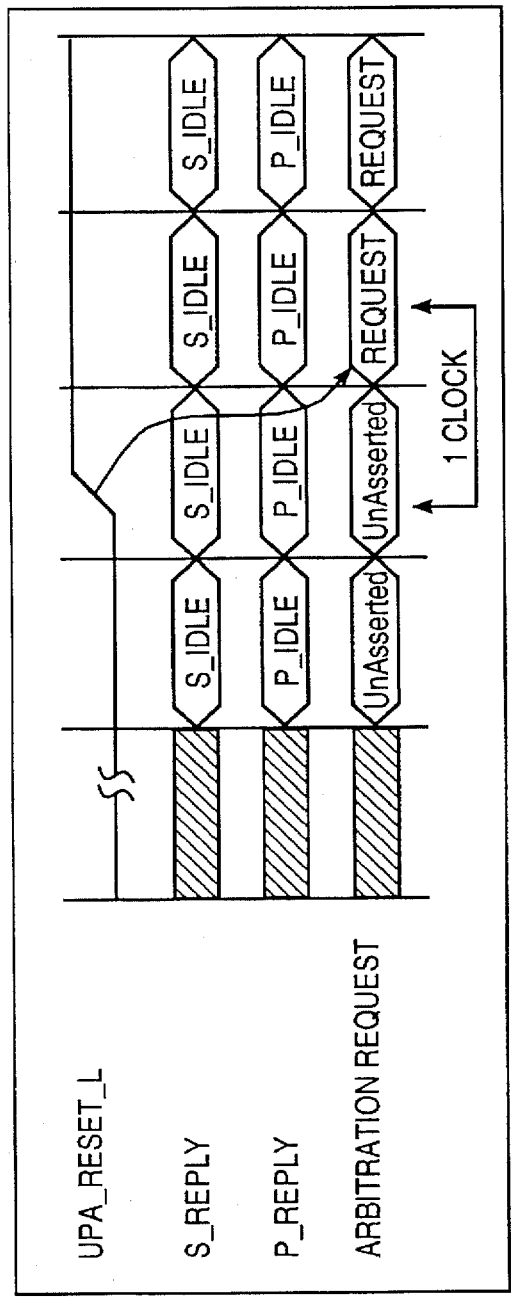
FIG. 3A is a table showing a round-robin assignment of a last port driver for four ports.
FIG. 3B is a timing diagram showing an arbitration request following a system reset.

FIG. 3A is a table showing an exemplary modified round-robin priority scheme for bus arbiters 216, 226, 236, 246 of processors 210, 220, 230, 240, respectively. The priority scheme is used by the arbitration system to select a next bus master from among the sub-systems competing for system bus 280. Each processor occupies a port (location) on system bus 280 and is assigned a unique identification number (ID). For system synchronization, processor 210, with port address 0, is selected to be a last port driver upon reset. Subsequently, every port keeps track of which port is the last port driver and to simultaneously (concurrently) determines which port should be assigned, i.e., selected to be, the next bus master based on the identity of the last port driver. Consequently, when a port wins arbitration and becomes the current bus master, the identity of the last port driver stored by every processor is updated with the ID of the new current bus master. For efficiency, the last port driver is treated preferentially.

FIGS. 3B and 4 through 9 are exemplary timing diagrams illustrating multi-processor system 200 wherein the width of the address bus is chosen such that two bus clocks cycles are required to complete an address transfer. Hence, in the following exemplary discussion, although each data transfer quantum (address information packet size) requires two clock cycles for completion, the notion of a two cycle data and/or address bus is not fundamental to this invention. For example, processor 210 drives a first cycle of address information onto system bus 280 during one system cycle, and a second cycle of address information during a second system clock cycle.

As is known to one skilled in the art, depending on the implementation, data and/or address packets can be transferred over a system bus in one or more system clock cycles, i.e., other system bus widths are possible. For example, in another embodiment, the address bus width is equal to the width of the system address space. In yet another embodiment, the address bus width is a quarter of the width of the system address space. Further note that processors 210, 220, 230, 240 are similar and hence a description of one sub-system, e.g., processor 210 or 220, is applicable to the other sub-systems, i.e., processors 220, 230, 240.

FIG. 3B show a reset timing sequence wherein a bus arbitration request may be asserted one clock cycle after a system reset signal UPA_Reset_L. Each of processors 210, 220, 230, 240 has a unique port address, 0, 1, 2, 3, respectively. An Arb_Reset signal on Arb_Reset line provides system controller 290 with a mechanism for selectively resetting state machine(s) of one or more sub-systems without resetting every state machine of each sub-system. For example, the Arb_Reset signal from system controller 290 enables processors 210, 220, 230, 240 to synchronize the respective arbitration state machines of bus arbiters 216, 226, 236, 246.

Figure 4:
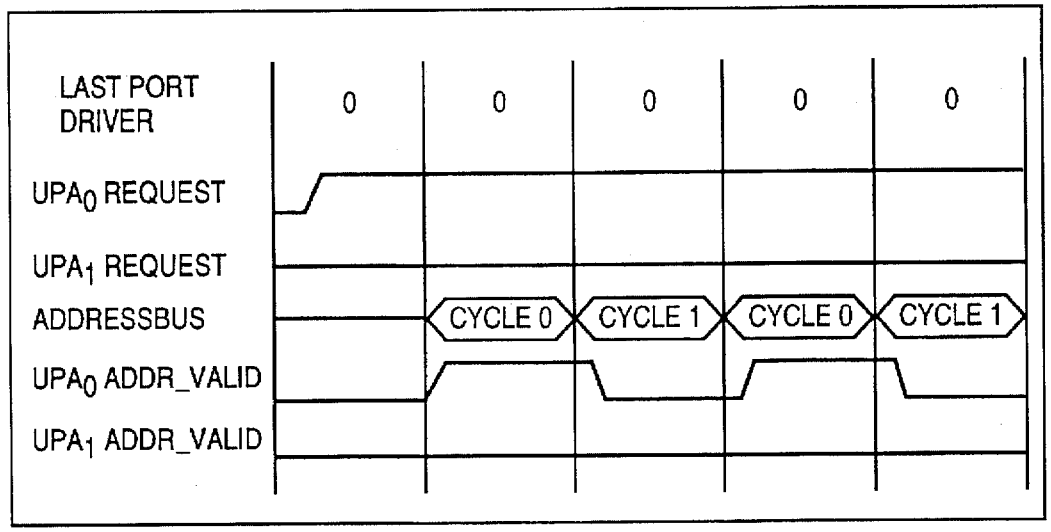
FIG. 4 is a timing diagram showing the last port driver transforming into a current bus master.

FIG. 4 is a timing diagram illustrating the transformation of the last port driver into the current bus master. Assuming that bus arbiters 216, 226 ... 296 have determined that there are no bus request(s) outstanding in a clock cycle preceding a first clock cycle, the last port driver is the only sub-system permitted to assert a bus request during the first clock cycle and immediately drive system bus 280 during a second clock cycle. For example, when processor 210 is the last port driver, processor 210 already has the highest priority and can be assigned, i.e., selected to be, the next bus master without the need to poll the bus request lines of the other processors 220, 230, 240 during the first clock cycle. Consequently, bus transceiver 212 is permitted to assert its bus request line Req_out_0 during the first system clock cycle and drive system bus 280 in the next immediate clock cycle, i.e., the second system clock cycle. In this example, processor 210 drives a first half of the address onto address bus 280 in the second system clock cycle and a second half of the address onto address bus 280 in a third system clock cycle.

Upon driving bus 280 in the second system clock cycle, processor 210 is assigned the status of the current bus master. The current bus master is defined as the sub-system which is currently driving address bus 280 and also asserting the UPA_Addr_Valid_x qualifier line of its transceiver, e.g., UPA_Addr_Valid_0 of transceiver 212. Being the current bus master, processor 210 can transmit multiple data packets back to back without any system clock latency by simply maintaining, i.e., continuing to assert, bus request line Req_out_0 of bus requester 214. Although the current bus master, processor 210, may drive any number of transaction packets (including no packet) before relinquishing system bus 280 in the presence of a bus request from another processor 220, 230, 240 or system controller 290, in order to eliminate the possibility of a deadlock, a well behaved current bus driver should release bus 280 within a finite number of clock cycles. In addition, the current bus master should also release its bus request line when the current bus master has no more request pending.

Figure 5:
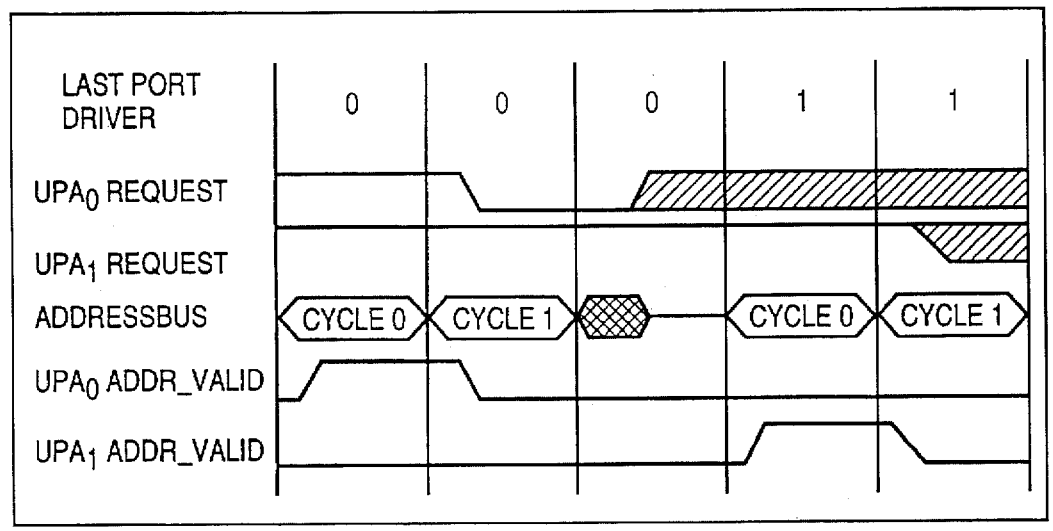
FIG. 5 is a timing diagram illustrating a change of bus driven between the current bus master and a next bus master.

As shown in FIG. 5, when a sub-system, e.g., processor 220, which is not the last port driver, asserts bus request line Req_out_1 of requester 224 while another sub-system, e.g., processor 210, is both the last port driver and the current bus master, then there is a latency of at least three system clock cycles before transceiver 222 of processor 220 is able to drive system bus 280. There are two reasons why a minimum of three latent system clock cycles are needed for displacing a current bus master which driving system bus 280. First, even though requester 224 has asserted bus request line Req_out_1 by the first system clock cycle, two system clock cycles are needed to complete the transmission of processor 210's last data packet of address information. Second, the arbitration protocol enforces a dead cycle in the third clock cycle.

Hence, assuming that no other processors with a higher priority than processor 220 is contending for system bus 280, processor 220 can now be assigned the next bus master and proceed to drive system bus 280 in a fourth system clock cycle. As a result, replacing an active current bus master requires three latent clock cycles.

As discussed above, the arbitration protocol provides an idle or dead cycle on system bus 280 between current bus master changes. The dead cycle eliminates the possibility of the bus driver circuitry of two bus masters, i.e., the current bus master and the next bus master, simultaneously driving system bus 280. One such example is where the turn-off time of the driver circuitry of the first bus master, i.e., processor 210, is longer than the turn-on time of the driver circuitry of the second bus master, i.e., processor 220. Note that when a current bus master asserts its bus request line, the total number of bus cycles required to switch the current bus master also depends on factors such as the state of processor 210's current data transfer, i.e., was the bus request from processor 220 asserted during the first or second half of processor 210's data transfer.

Figure 6:
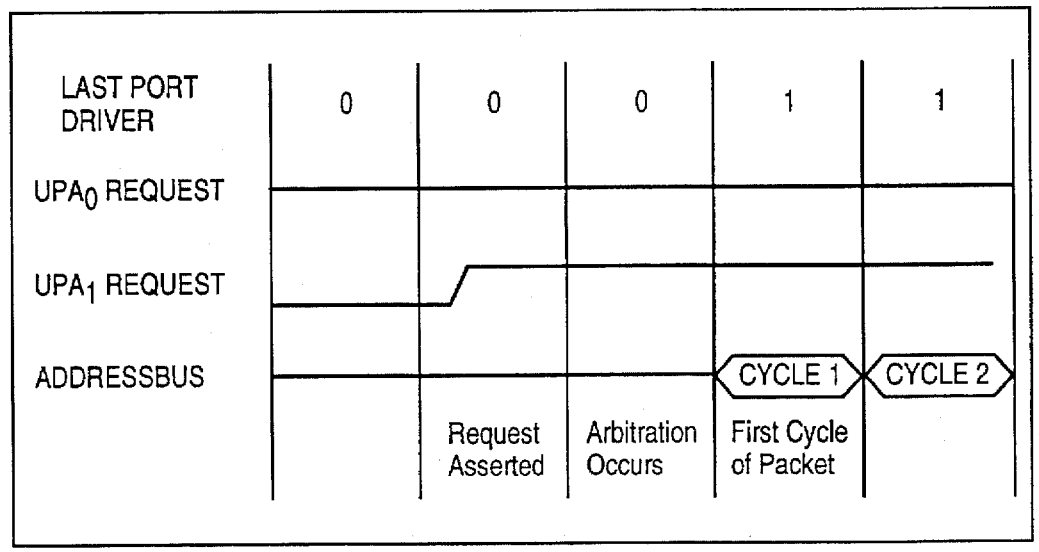
FIG. 6 is a timing diagram illustrating another processor becoming the last port driver and the current bus master.

FIG. 6 is a timing diagram illustrating a different sub-system, e.g., processor 220, becoming the last port driver and eventually the current bus master when system bus 280 is inactive, i.e., not being driven. During the first clock cycle, processor 210, the last port driver, is inactive and is not driving system bus 280. When requester 224 of processor 220 asserts bus request line Req_out_1 in the second clock cycle, arbitration occurs in the next clock cycle, i.e., the third clock cycle. Assuming that no other processors with a higher priority than processor 220 needs bus 280, processor 220 can now be assigned the next bus master and permitted to drive bus 280 in a fourth system clock cycle. Hence, where the requesting processor is not the last port driver and system bus 280 is inactive, a total of two latent system clock cycles are needed between the bus request and ownership of bus 280.

Figure 7:
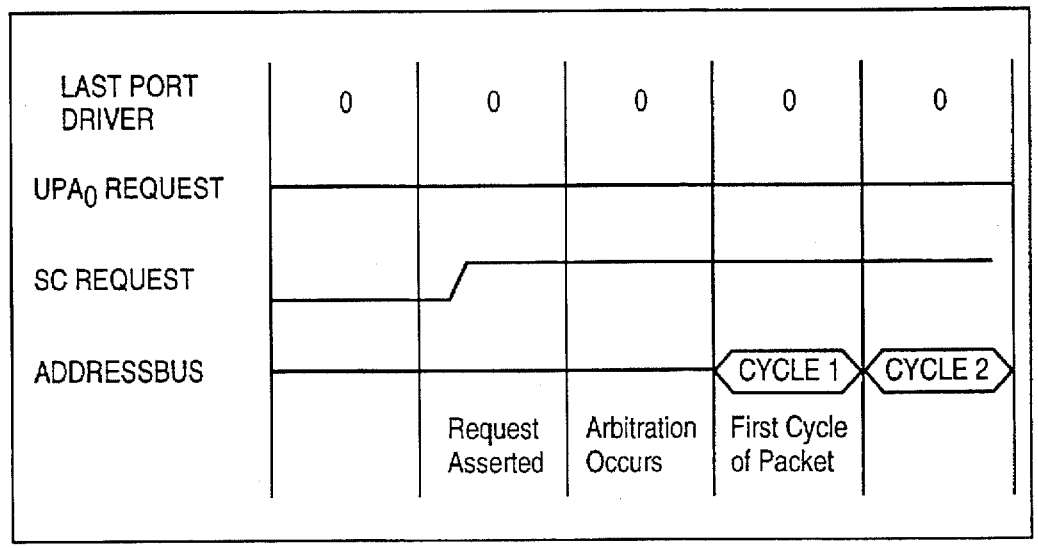
FIG. 7 is a timing diagram showing a special port, a system controller, becoming the current bus master.

Referring now to FIG. 7, system controller 290 makes a bus request and eventually becomes the current bus master. When system controller 290 asserts request line SC_Req of requester 294 during the second clock cycle while processor 210 is the last port driver but inactive, another system clock cycle, the third cycle, is needed for arbitration. Subsequently, in the fourth clock cycle, system controller 290 is permitted to drive address bus 280. Hence, there are two latent system clock cycles which is similar to the instance where one sub-system wants to drive bus 280 while another sub-system is an inactive last port driver.

In accordance with another aspect of the invention, the arbitration protocol allows a "real-parking" mode which further reduces arbitration latencies where system 200 has only two possible bus drivers, i.e., two bus masters, for example when there are only processors 210, 220, coupled to system bus 280. In the case of this reduced system, the arbitration latency for retaining the current bus master can be reduced to zero system clock cycle by simply maintaining the bus request of the current bus master after completion of the data transfer.

In some embodiments, the arbitration protocol of system 200 allows a pre-assigned special port, e.g., system controller 290, to be treated preferentially, i.e., the special port is not required to participate in the round-robin scheme. In this example, system controller 290 is given the highest priority whenever its bus request is asserted. The special port designation advantageously offers specific flexibility in the design of the higher level architecture of system 200. Hence, whenever system controller 290 wins arbitration, the last port driver identity maintained by all the ports coupled to the system, i.e., processors 210, 220, 230, 240, is not updated since system controller 290 does not participate in the modified round-robin protocol.

Bidirectional bus qualifier signals UPA_Addr_Valid_0, UPA_Addr_Valid_1, UPA_Addr_Valid_2 and UPA_Addr_Valid_3 are exchanged between the special port, system controller 290, and processors 210, 220, 230, 240, respectively, enabling system controller 290 to detect when the current bus master is driving a valid packet. Conversely, when system controller 290 is the current bus master, the validity signals enable a slave sub-subsystem to know when to receive a data packet from system controller 290. In addition, a validity signal is asserted during the first system clock cycle of each two cycle packet, and deasserted during the second cycle. Holding amplifiers of system controller 290 maintain the logic level of UPA_Addr_Valid lines whenever there is no active bus driver. Other benefits of using holding amplifiers on system controller 290 include ease of debugging system bus 280.

Figure 8:
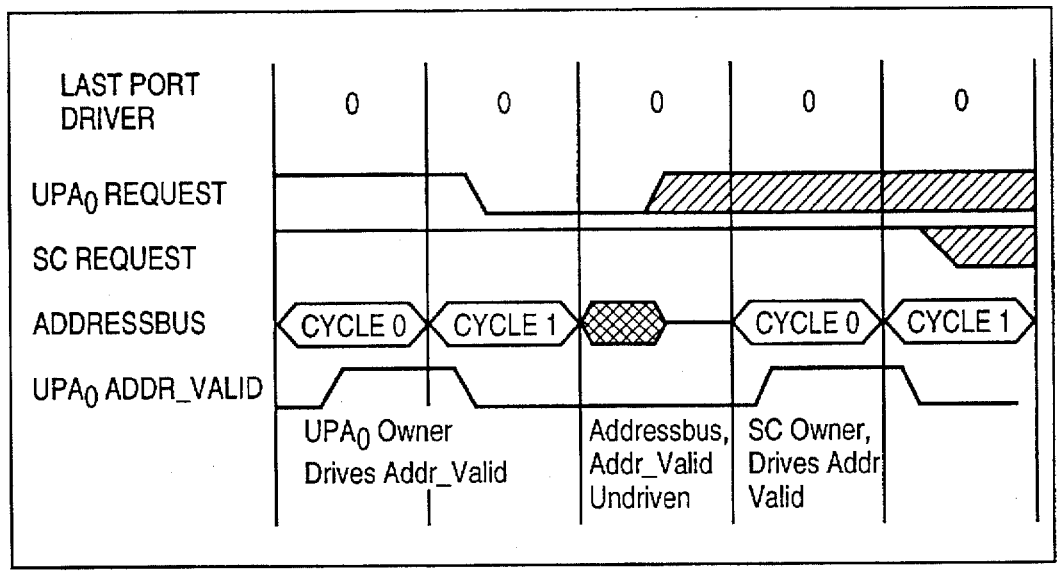
FIG. 8 is a timing diagram showing the system controller sending a packet to the last port driver.

FIG. 8 is a timing diagram illustrating a data packet transfer from the special port, e.g., system controller 290, to processor 210. When system controller 290 asserts request line SC_Req while the transceiver of the current bus master, e.g., transceiver 212 of processor 210, is driving bus 280, processor 210 is permitted to complete the ongoing transfer of the last data packet. Since system controller 290 is the special port, processor 210 is expected to release request line Req_out_0 of requester 214. As discussed above, system controller 290 always has the highest priority relative to the other sub-systems and hence need not be assigned the next bus master. As such, processor 210 can remain the last port driver when transceiver 292 of system controller 290 is driving system bus 280. From the perspective of system controller 290, the completion of the transfer of the last data packet by processor 210 incurs two latent system clock cycles. A third latent clock cycle is needed to prevent system bus fights, i.e., attempts by multiple sub-systems to simultaneously drive system bus 280. Thereafter, system controller 290 becomes the current bus master and is permitted to drive system bus 280. Note that pre-assigning system controller 290 with the highest priority relative to sub-systems 210, 220, 230, 240 is merely an implementational option. The arbitration system of the present invention is also applicable to other systems where system controller 290 has equal or lower priority relative to sub-systems 210, 220, 230, 240.

Figure 9:
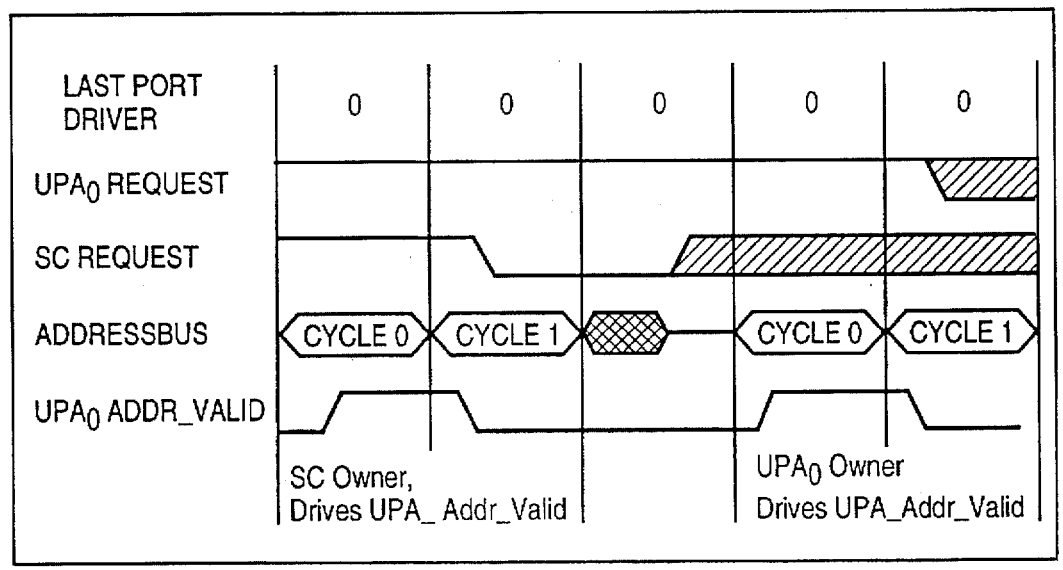
FIG. 9 is a timing diagram showing a change of bus drivers between the system controller and the last port driver.

As shown in FIG. 9, system controller 290 surrenders ownership of system bus 280 in response to a bus request from an inactive sub-system which was the last port driver. When system controller 290 is the current bus master and detects a bus request from an inactive last port driver, e.g., processor 210, system controller 290 completes the transfer of the last data packet in two system clock cycles. A third latent system clock cycle is needed before the last port driver, e.g., processor 210 can begin to drive system bus 280 and become the current bus master.

Other modifications and additions are possible without departing from the spirit of the invention. For example, the total number of sub-systems can be smaller or larger. The address bus can be wider or narrower with respect to the system address space. In addition, the sub-systems can include video controllers, cache controllers and mathematical co-processors such as floating point units. Hence, the scope of the invention should be determined by the following claims.

What is claimed is:

1. A method for arbitrating access to a system bus coupled to a plurality of sub-systems, each sub-system including a bus arbiter, the method comprising the steps of:

storing in the bus arbiter of each sub-system a first value indicating which sub-system, if any, is a current bus master of the system bus, and a second value indicating which sub-system is a last port driver, wherein the last port driver is a last bus master of the system bus; all of the bus arbiters independently storing identical first and second values;

at each sub-system, asserting a bus request for the system bus whenever the associated sub-system requires use of the system bus, each asserted bus request being transmitted to the bus arbiters of all the sub-systems;

within each bus arbiter, when the first stored value indicates there is a current bus master, ignoring any bus requests asserted by any of the sub-systems until the current bus master relinquishes control of the system bus;

whenever there is a current bus master, at the sub-system comprising the current bus master, if the current bus master sub-system requires continued use of the system bus and predefined criteria for enabling continued use of the system bus are satisfied, continue driving the system bus with the current bus master sub-system without interruption;

within each bus arbiter, whenever there is not a current bus master, detecting and processing any asserted bus requests so as determine a next bus master, the asserted bus requests processing step including:

determining that there is no bus requested asserted by any of the plurality of sub-systems which remain outstanding during a first system clock cycle;

if, during the first bus cycle a bus request by the sub-system indicated by the second value to be the last port driver is detected, setting the first value to indicate that the current bus master is the last port driver regardless of any bus requests by any other ones of the sub-systems, and enabling the last port driver sub-system to drive the system bus during a second system clock cycle; and if, during the first bus cycle a bus request by the sub-system indicated by the second value to be the last port driver is not detected and at least one bus request by any other sub-system is detected, performing bus arbitration during a second system clock cycle to select a next bus master, setting the first value and second value to indicate the selected next bus master, and enabling the selected next bus master to drive the system bus during a third system clock cycle.

2. The method of claim 1, including dynamically assigning priorities for use of the system bus to each of the sub-systems in accordance with the stored second value indicating which of the sub-systems is the last port driver, wherein the last port driver sub-system is dynamically assigned a highest priority for use of the system bus.

3. A method for arbitrating access to a system bus coupled to a plurality of sub-systems, each sub-system including a bus arbiter, the method comprising the steps of:

assigning a first of the plurality of sub-systems to be a special port driver of the system bus with a permanently assigned highest priority for use of the system bus;

storing in the bus arbiter of each sub-system a first value indicating which sub-system, if any, is a current bus master of the system bus, and a second value indicating which sub-system other than the special port driver sub-system is a last port driver, wherein the last port driver is a last bus master of the system bus other than the special port driver sub-system; all of the bus arbiters independently storing identical first and second values;

at each sub-system, asserting a bus request for the system bus whenever the associated sub-system requires use of the system bus, each asserted bus request being transmitted to the bus arbiters of all the sub-systems;

within each bus arbiter, when the first stored value indicates there is a current bus master, ignoring any bus requests asserted by any of the sub-systems until the current bus master relinquishes control of the system bus;

whenever there is a current bus master, at the sub-system comprising the current bus master, if the current bus master sub-system requires continued use of the system bus and predefined criteria for enabling continued use of the system bus are satisfied, continue driving the system bus with the current bus master sub-system without interruption;

within each bus arbiter, whenever there is not a current bus master, detecting and processing any asserted bus requests so as determine a next bus master, the asserted bus requests processing step including:

determining that there is no bus requested asserted by any of the plurality of sub-systems which remain outstanding during a first system clock cycle;

if, during the first bus cycle a bus request by the sub-system indicated by the second value to be the last port driver is detected and a bus request by the special port driver sub-system is not detected, setting the first value to indicate that the current bus master is the last port driver regardless of any bus requests by any other ones of the sub-systems, and enabling the last port driver sub-system to drive the system bus during a second system clock cycle; and if, during the first bus cycle a bus request by the sub-system indicated by the second value to be the last port driver is not detected and at least one bus request by any other sub-system is detected, performing bus arbitration during a second system clock cycle to select a next bus master, setting the first value and second value to indicate the selected next bus master, and enabling the selected next bus master to drive the system bus during a third system clock cycle.

4. The method of claim 3, including dynamically assigning priorities for use of the system bus to each of the sub-systems in accordance with the stored second value indicating which of the sub-systems is the last port driver, wherein the special port driver sub-system is always assigned a highest priority for use of the system bus and the last port driver sub-system is dynamically assigned a second highest priority for use of the system bus.

5. The method of claim 3, wherein the predefined criteria for enabling continued use of the system bus include a criterion that whenever the current bus master is not the special port driver sub-system and the special port driver sub-system asserts a request for use of the system bus, the current bus master relinquishes control of the system at a predefined time after the current bus master's bus arbiter detects the special port driver's request.

* * * * *